United States Patent [19]

Amano et al.

[11] Patent Number: 5,420,215
[45] Date of Patent: May 30, 1995

[54] PROCESS FOR PRODUCING VINYL CHLORIDE-BASED POLYMER

[75] Inventors: Tadashi Amano, Kamisu, Japan; Shuji Ohnishi, Lake Jackson, Tex.

[73] Assignee: Shin-Etsu Chemical Co., Ltd., Tokyo, Japan

[21] Appl. No.: 174,522

[22] Filed: Dec. 28, 1993

[30] Foreign Application Priority Data

Dec. 28, 1992 [JP] Japan .................................. 4-360874

[51] Int. Cl.$^6$ ........................... C08F 2/18; C08F 14/06
[52] U.S. Cl. ...................................... 526/74; 526/88; 526/344.2
[58] Field of Search ............... 526/62, 74, 88, 344.2

[56] References Cited

FOREIGN PATENT DOCUMENTS

0526741A2  2/1993  European Pat. Off. .
2457304   12/1980  France .

OTHER PUBLICATIONS

Patent Abstracts of Japan, vol. 11, No. 295 (M-626), Sep. 24, 1985, JP-A-62 085 195, Apr. 18, 1987.

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A process for producing a vinyl chloride-based polymer by suspension polymerizing vinyl chloride monomer or the like while circulating a reaction mixture in a polymerization vessel by a circulating pump through a circulation line led out from the polymerization vessel to extend through a heat exchanger back to the vessel, wherein the pump comprises a conical hub and an impeller comprised of a spirally shaped single blade provided on the hub, and, during polymerization, the stirring energy (A) applied to the reaction mixture by the stirrer in the polymerization vessel and the circulating energy (B) exerted to the reaction mixture by the circulating pump in the circulation line are controlled so as to satisfy the relationships $$(A)+(B) = \text{from } 1.5 \text{ to } 4.0 \text{ kW}/t \tag{1}$$

and $$(B)/[(A)+(B)] = \text{from } 0.1 \text{ to } 0.6 \tag{2}$$

Polymer scale is prevented from being deposited on inner surfaces of the heat exchanger, circulation piping, circulating pump or the like.

5 Claims, 2 Drawing Sheets

PROCESS FOR PRODUCING VINYL CHLORIDE-BASED POLYMER

BACKGROUND OF THE INVENTION

1. Field of the Invention

The present invention relates to a process for producing a vinyl chloride homopolymer or vinyl chloride-based copolymer (hereinafter generically referred to as "vinyl chloride-based polymer") by polymerizing vinyl chloride or a vinyl chloride-containing monomeric mixture in an aqueous medium while circulating the reaction mixture through a heat exchanger which is arranged in the exterior of a polymerization vessel.

2. Description of the Prior Art

Heretofore, suspension polymerization of vinyl chloride or a vinyl chloride-containing monomeric mixture (hereinafter referred to as "vinyl chloride or the like") in an aqueous medium has been carried out by charging water, monomer, polymerization initiator, dispersing agent and, optionally, other additives as required, into a polymerization vessel equipped with a jacket and a reflux condenser, and passing cooling water through the jacket and reflux condenser to remove heat of polymerization reaction, thereby controlling the reaction system at a predetermined temperature. In order to attain higher productivity, there has been a tendency toward the use of larger-capacity polymerization vessels.

In recent years, it has come to be desired to shorten polymerization time while using a large-capacity polymerization vessel, in order to achieve a further enhanced productivity. Where the capacity of polymerization vessel is increased, however, the heat transfer surface area per unit volume of polymerization reaction mixture is decreased, leading to deficiency in heat-removing capability. This problem becomes particularly conspicuous where a polymerization vessel with an internal capacity of 40 $m^3$ or more is used.

For coping with the above problem, a method wherein an aqueous suspension mixture under polymerization is passed through a heat exchanger arranged outside of a polymerization vessel, to be thereby cooled, and is then returned into the polymerization vessel has come to draw attention as an extremely efficient means of increasing the heat-removing capability, since the method offers a remarkable gain in the heat-transmitting surface area with which the aqueous suspension mixture comes into contact to be thereby cooled (Refer to Japanese Pre-examination Patent Publication (KOKAI) Nos. 54-024991 (1979), 56-047410 (1981), and 58-032606 (1983)).

According to the above method, however, it is necessary that the circulation of the aqueous dispersion mixture through the heat exchanger should be started after a polymerization degree of about 20% is reached or exceeded or that a special type of heat exchanger should be used. Otherwise, polymer scale deposition would occur in the circulation piping, and it would be difficult to maintain good quality of the resulting polymeric product in regard of plasticizer absorption, particle size distribution, fish eyes, etc. Therefore, the above-mentioned method has not been employed industrially (R. H. Bargess, "Manufacture and Processing of PVC", Applied Science Publishers, Ltd., London, 1982, p.32).

SUMMARY OF THE INVENTION

Accordingly, it is an object of the present invention to provide a process for producing a vinyl chloride-based polymer by carrying out polymerization in a polymerization vessel while circulating an aqueous suspension mixture through an external circulation line provided with a heat exchanger by which it is ensured that polymer scale is hardly deposited on inner surfaces of a circulation piping, a circulating pump, the heat exchanger, etc. even where the circulation is started at the beginning of the polymerization reaction.

The present invention has been achieved based on the present inventors' studies made for attaining the above object, in which various pumps such as centrifugal pumps, gear pumps, screw pumps and the like were put to practical tests and it was found that the aforementioned problems can be solved by using of a pump of specific structure as a circulating pump for the circulation line described above.

Namely, the present invention provides a process for producing a vinyl chloride-based polymer by suspension polymerization of vinyl chloride monomer or a vinyl chloride-containing monomeric mixture in an aqueous medium in the presence of a dispersing agent and a polymerization initiator in a polymerization vessel equipped with a stirrer, the polymerization being carried out while circulating a reaction mixture in the polymerization vessel by a circulating pump through a circulation line which is led out from the polymerization vessel to extend through a heat exchanger back to the polymerization vessel, wherein the circulating pump comprises:

- a casing composed of a truncated cone-shaped half portion and a generally disklike shaped half portion in connection with the base side of the truncated cone, the casing having an inlet for drawing the reaction mixture into the casing and an outlet for discharging the reaction mixture out of the casing, the inlet located on the smaller plane side of the truncated cone-shaped half portion, and the outlet located at a side portion of the disklike shaped half portion;
- a conically shaped hub disposed internal to and central to the casing; and
- a single blade provided on a side portion of the hub in a spiral form extending substantially from the apex of the hub cone to the base of the hub cone, the outer edge of the blade being in such close proximity to the inner wall surface of the truncated cone-shaped half portion of the casing as to almost touch the inner wall surface, and wherein, during polymerization, the stirring energy (A) applied per ton (weight) of the reaction mixture by the stirrer in the polymerization vessel and the circulating energy (B) exerted per 1 t weight of the reaction mixture by the circulating pump in the circulation line are controlled so as to satisfy the relationships represented by the formulas (1) and (2):

$$(A)+(B) = \text{from 1.5 to 4.0 } kW/t \quad (1)$$

$$(B)/[(A)+(B)] = \text{from 0.1 to 0.6} \quad (2)$$

According to the process of the present invention, a reaction mixture in a polymerization vessel is, during polymerization, circulated through a circulation line equipped with a heat exchanger arranged outside of the vessel, whereby polymer scale deposition on the inner surfaces of the heat exchanger, circulation piping, circulating pump or the like can be totally prevented even if the circulation is started from the beginning of the polymerization reaction. As a result, removal of heat by the external circulation line can be utilized from immediately upon the start of polymerization. Therefore, polymerization time in using a large-capacity polymerization vessel can be shortened, and vinyl chloride-based polymers can be produced at high efficiency. In addition, since deposition of polymer scale is effectively prevented, it is possible to produce with high productivity a vinyl chloride-based polymer of high quality which has good particle size distribution and plasticizer absorption and has few fish eyes when formed into sheet or the like. The process according to the present invention is particularly effective where polymerization is conducted in a polymerization vessel with an inner capacity of 40 m$^3$ or more and completed within a time of 4.5 hours, especially within 4 hours.

DETAILED DESCRIPTION OF PREFERRED EMBODIMENTS

Figure 1:
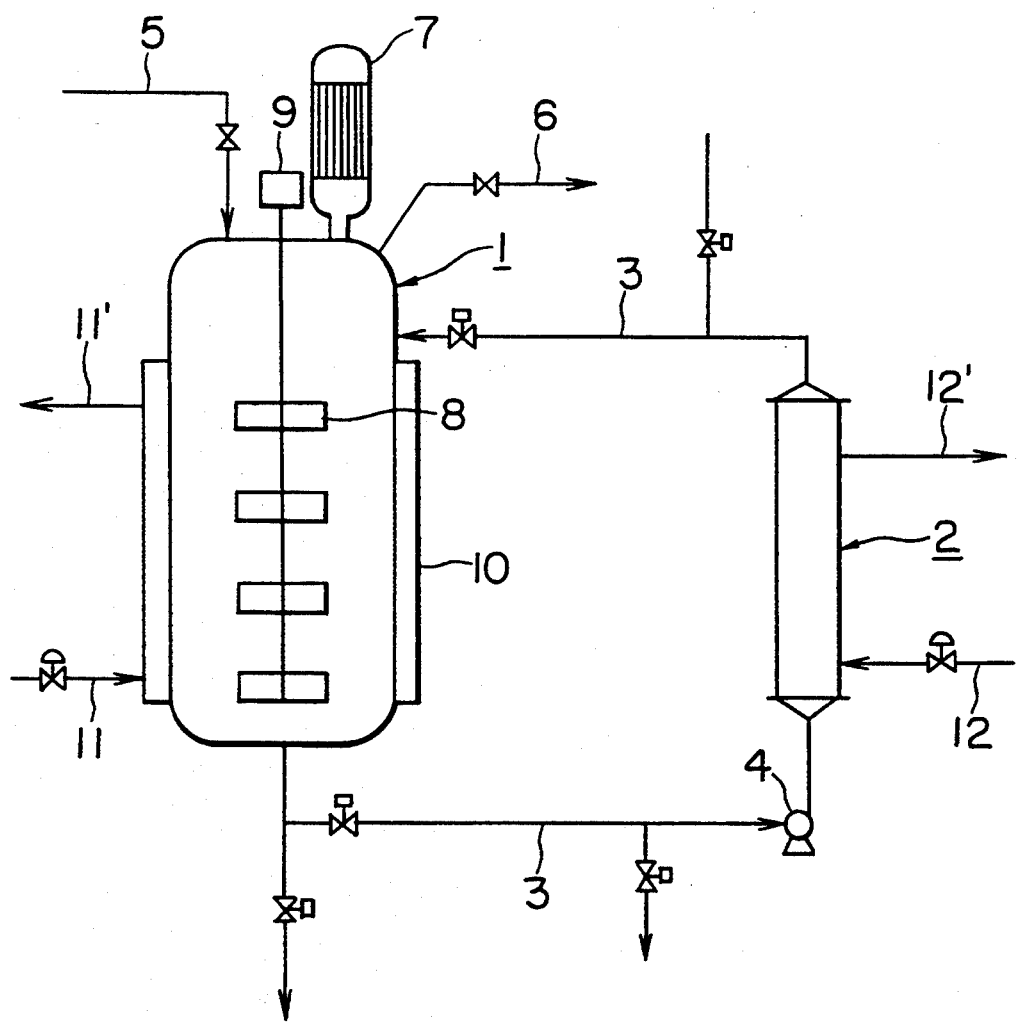
FIG. 1 schematically shows an exemplary polymerization apparatus for carrying out the process of the present invention, comprising a circulation line led out from a polymerization vessel and extended through a heat exchanger back to the vessel.

FIG. 1 schematically illustrates the total construction of a polymerization apparatus for use in carrying out the process of the present invention. In FIG. 1, there are shown a polymerization vessel 1, a heat exchanger 2 for heating or cooling a polymerization reaction mixture, and a circulation piping 3 extended from a bottom portion of the polymerization vessel 1 and through the heat exchanger 2 back to an upper portion of the polymerization vessel 1. Also shown in the figure is a circulating pump 4 disposed in the circulation piping 3 between the polymerization vessel 1 and the heat exchanger 2. At the top portion of the polymerization vessel, there are arranged a piping 5 for feeding raw material, a piping 6 for recovery of unreacted monomer, a reflux condenser 7, and a stirrer motor 9 which drives a stirrer 8 in the polymerization vessel. The polymerization vessel is equipped with a jacket 10, which is supplied with a cooling or heating medium through a piping 11, 11', while the heat exchanger 2 is supplied with a cooling or heating medium via a piping 12, 12'.

In the polymerization apparatus for use in the process according to the present invention, the aqueous suspension mixture containing a monomer, an aqueous medium, a dispersing agent, an oil-soluble polymerization initiator and the like is drawn out from the bottom portion of the polymerization vessel 1 under the action of the circulating pump 4. The aqueous suspension mixture thus drawn out is fed through the circulation piping 3 to the heat exchanger 2, where the suspension mixture is cooled or heated, before being conveyed again through the piping 3 and back into a gas-phase or liquid-phase region in the polymerization vessel 1.

According to the process of the present invention, the circulation pump 4 is a pump which has a conical hub and an impeller comprised of a spirally shaped single blade mounted on the conical hub. Such pump is shown in FIG. 2.

Figure 2:
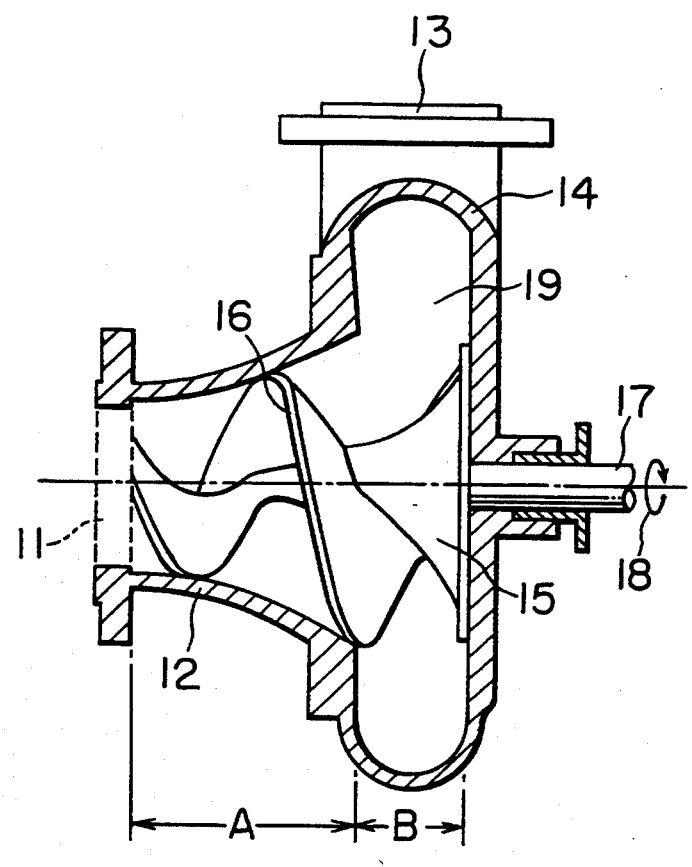
FIG. 2 is a vertical sectional view of an example of a pump to be used as a circulating pump for carrying out the process according to the present invention.

The pump as shown in FIG. 2 comprises a conically shaped hub 15 mounted on a rotating shaft 17 for any desired rotation, and an impeller 16 composed of a single blade formed in a spiral shape around the hub 15. The diameter of the impeller 16 is small at the apex of the conical hub 15 and increases gradually toward the base of the hub 15. Of the casing surrounding the hub 15 and the impeller 16, an about half portion 14 on the base side of the hub 15 has a thick circular disk-like configuration such that an annular space (volute chamber) 19 can be defined around the hub 15. An about half portion 12 of the casing on the apex side of the hub 15 has the shape of a truncated cone, the inside diameter of which is selected so as to almost touch the outer edge of the spiral-blade impeller 16. At the smaller end of the truncated cone-shaped casing portion 12, is opened a suction port 11 for an aqueous suspension mixture, and a feed pipe 3 as shown in FIG. 1 is attached thereto. A side wall of the disklike shaped casing portion 14 is provided with a discharge port 13 for the aqueous suspension mixture, which is connected to the circulation piping 3 shown in FIG. 1.

In the pump as described above, the hub 15 and the impeller 16 are rotated in the direction of arrow 18. In a zone A corresponding to the truncated cone-shaped casing portion 12, the impeller 16 principally exerts a screw action on the aqueous suspension mixture. That is, in this zone, the impeller 16 with the screw-like shape acts in a manner similar to a positive displacement pump. In addition, with only one blade, the impeller 16 produces a gentle flow, so that cavitation due to centrifugal forces and shearing forces is not likely to occur and, at the same time, a strong suction force is exerted on the suspension mixture being introduced through the suction port 11. Besides, because the impeller 16 disposed inside the truncated cone-shaped casing portion 12 is gradually increased in diameter toward the disklike shaped casing 14, during the rotation of the impeller 16 the aqueous suspension mixture present near the outer peripheral edge of the impeller 16 is permitted to flow smoothly, while acquiring a gradually increasing flow velocity in the circumferential direction, resulting in an added discharging pressure.

In a zone B corresponding to the disklike shaped casing portion 14, on the other hand, a centrifugal action is predominantly exerted on the aqueous suspension mixture, so that the polymerization reaction mixture, is discharged through the discharge port 13 at a high discharge pressure.

Pumps of this construction are commercially available generally under the trade name "Hydrostal Pump" (product by Taiheiyo Kinzoku K.K.).

In the process according to the present invention, the pump as above-described is used as the circulating pump 14, whereby polymer scale deposition is prevented from occurring in the system. As a result, the aqueous suspension mixture containing the monomer, aqueous medium, dispersing agent, oil-soluble polymerization initiator and the like charged in the polymerization vessel 1 can be rapidly cooled by passing ordinary cooling water through the circulation piping 3, without using a refrigeration machine or other heat-removing means.

Thus, the mixture charged in the polymerization vessel can be heated rapidly and, besides, removal of heat can be effected from the beginning stage of polymerization.

In the process of the present invention, it is necessary that, during polymerization, the sum of the stirring energy (A) applied by the stirrer of the polymerization vessel per ton (weight) of the aqueous suspension mixture in the vessel and the circulating energy (B) exerted by the circulating pump in the circulation line per 1 t weight of the aqueous suspension mixture should be controlled to within the range from 1.5 to 4.0 kW/t weight of mixture, preferably, from 1.5 to 3.0 kW/t.

Herein the "stirring energy" or "circulating energy" exerted on the aqueous suspension mixture respectively refers to the net energy required for stirring or circulating the aqueous suspension mixture, calculated by subtracting various energy losses, such as loss associated with motor efficiency, conduction loss, mechanical seal loss, etc. from the energy applied to the stirrer motor 9 or to the driving motor for the circulating pump 4 during the polymerization operation (the applied energy is electrically measurable with a wattmeter).

Where the sum of the stirring energy (A) and the circulating energy (B) is less than 1.5 kW/t, a reduction in polymerization time may lead to such disadvantages as formation of coarse grains of polymeric product, an increased number of fish eyes, a lowered plasticizer absorption or the like. Where the sum (A)+(B) exceeds 4.0 kW/t, on the other hand, there may result a broader particle size distribution, a lowered bulk specific gravity, a higher possibility of polymer scale deposition in the polymerization vessel or circulation piping, or the like.

According to the present invention, the ratio of (B)/[(A)+(B)] is in the range from 0.1 to 0.6, preferably from 0.2 to 0.5. Where the ratio is less than 0.1, a shortening of polymerization time may disadvantageously lead to formation of coarser polymer particles, a greater number of fish eyes, or the like. On the other hand, where the ratio exceeds 0.6, the resulting polymeric product may have a broader distribution of particle size or a lowered plasticizer distribution, and polymer scale deposition is more liable to occur in the polymerization vessel or circulation piping.

Other conditions in carrying out the process of the present invention may be similar to those conventionally employed, and are not specifically limited.

As the polymerization vessel 1, those of the well-known types equipped with stirrer, reflux condenser, baffle, jacket or the like may be used. As the stirrer, those which comprise stirring blades of paddle, Pfaudler, Brumagin, propeller, turbine or the like types may be used, either singly or, if necessary, in combination with a baffle in the form of flat plate, cylinder, hairpin coil or the like.

As the heat exchanger 2, heat exchangers of shell-and-tube, coil or spiral type or trombone coolers and the like which are in general use can be used. As a heating or cooling medium in the heat exchanger, may be used steam, cooling water, brine or the like. Besides, the circulation piping 3 itself may be constructed as a double-wall tube and cooling water or brine may be passed through the gap between the inner and outer walls, to thereby enhance the efficiency of heat removal.

Those parts which are contacted by the reaction mixture, such as the heat exchanger 2, circulating piping 3, circulating pump 4 and, further, valves and the like are preferably formed of stainless steel such as 18Cr-8Ni austenitic, 13Cr ferritic, martensitic, 18Cr ferritic, high-chromium ferritic, and two-phase austenitic-ferritic stainless steels, from the viewpoints of heat transfer and corrosion resistance.

Besides, the inner surfaces of these devices have preferably been specular-finished by buffing, immersion electrolytic polishing, electrolytic composite polishing or the like to have a surface roughness in terms of maximum height Rmax according to JIS B 0601 (1982) of 1 $\mu$m or less. Where the maximum height Rmax exceeds 1 $\mu$m, growth of polymer scale is accelerated with the result of easier deposition of polymer scale on the polished surfaces.

A polymer scale preventive agent well known in the art may be applied to these inner surfaces, or such agent may be added to the aqueous suspension mixture.

It is preferable to provide the heat exchanger 2 and the circulation piping 3 with an internal structure or configuration suitable for preventing the aqueous suspension mixture from stagnating therein, and to control the linear flow velocity of the aqueous suspension mixture to a value of 0.7 m/sec or more. If the linear velocity is too low, polymer scale deposition is liable to occur.

The vinyl chloride-based polymer to be produced by the process of the present invention includes copolymers of vinyl chloride with other vinyl monomer (normally, the vinyl chloride content of the copolymer is at least 50% by weight), in addition to vinyl chloride homopolymers. The comonomers to be copolymerized with vinyl chloride, for example, $\alpha$-olefins such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like; acrylic acid and esters thereof, such as acrylic acid, methyl acrylate, ethyl acrylate and the like; methacrylic acid and esters thereof, such as methacrylic acid, methyl methacrylate and the like; maleic acid and esters thereof; vinyl esters such as vinyl acetate, vinyl propionate and the like; vinyl ethers such as lauryl vinyl ether, isobutyl vinyl ether and the like; maleic acid anhydride; acrylonitrile; styrene; vinylidene chloride; and other monomers which are copolymerizable with vinyl chloride. These may be used either singly or in combination of two or more.

As the polymerization initiator in the process of the present invention, those initiators conventionally used for polymerization of vinyl chloride or the like can be used. Examples of the usable initiators include percarbonate compounds such as diisopropyl peroxydicarbonate, di-2-ethylhexyl peroxydicarbonate, diethoxyethyl peroxydicarbonate and the like; per-ester compounds such as t-butyl peroxyneodecanate, t-butyl peroxypivalate, t-hexyl peroxypivalate, $\alpha$-cumyl peroxyneodecanate, 2,4,4-trimethylpentyl peroxy-2-neodecanoate, t-hexyl peroxyneodecanoate, 1-cyclohexyl-1-methylethyl peroxyneodecanoate, ($\alpha$, $\alpha'$-bisneodecanoylperoxy)-diisopropylbenzene, 1,1-dimethyl-3,3-hydroxybutyl peroxyneodecanoate and the like; peroxides such as acetylcyclohexylsulfonyl peroxide, 2,4,4-trimethylpentyl 2-peroxyphenoxyacetate, 3,5,5-trimethylhexanoyl peroxide, lauroyl peroxide, isobutyl peroxide and the like; azo compounds such as azobis-2,4-dimethylvaleronitrile, azobis(4-methoxy-2,4-dimethylvaleronitrile) and the like; and, further, potassium persulfate, ammonium persulfate, hydrogen peroxide, cumene hydroperoxide, and the like. These can be used either singly or in combination of two or more.

These polymerization initiators are normally be added preferably in an amount of from 0.05 to 2 parts by weight per 100 parts by weight of the monomer charge. The initiators are added after diluted with a solvent, or as an aqueous emulsion or aqueous suspension.

In order to complete polymerization within 4 hours, it is preferable to use a peroxide polymerization initiator which has a 10-hour half-life temperature at a concentration of 0.1 mol % in benzene (hereinafter referred to simply as "10-h half-life temperature") of 40° C. or below, in an amount of from 0.01 to 0.15 part by weight per 100 parts by weight of the monomer charge. Where a peroxide polymerization initiator having the 10-h half-life temperature of 40° C. or below is thus used, the polymerization time can be shortened to 4 hours or less, while ensuring that the heat of polymerization reaction is evolved evenly and that the polymeric product obtained is not impaired in quality as to initial coloration or thermal stability. If the amount of the peroxide initiator added is less than 0.01 part by weight, the obtained effect of shortening polymerization time is slight. Where the addition amount exceeds 0.15 part by weight, a peak of heat evolution is reached in the beginning stage of polymerization, so that effective heat removal is impossible.

The peroxide polymerization initiator having a 10-h half-life temperature of 40° C. or below, as described above, includes the followings (the parenthesized values are the respective 10-h half-life temperatures).

| | |
|---|---|
| α-Cumyl peroxyneodecanoate | (36.6° C.) |
| Isobutyl peroxide | (32.5° C.) |
| Acetylcyclohexylsulfonyl peroxide | (26.5° C.) |
| (α,α'-Bisneodecanoylperoxy)diisopropylbenzene | (36.4° C.) |
| 1,1-Dimethyl-3-hydroxybutyl peroxyneodecanoate | (37.0° C.) |

The dispersing agents which can be used in the process of the present invention include, for example, water-soluble cellulose-ethers such as methyl cellulose, ethyl cellulose, hydroxyethyl cellulose, hydroxypropyl cellulose, hydroxypropyl methyl cellulose and the like; water-soluble and oil-soluble partially saponified polyvinyl alcohols; water-soluble polymers such as acrylic acid polymer, gelatin and the like; oil-soluble emulsifiers such as sorbitan monolaurate, sorbitan trioleate, sorbitan monostearate, glycerin tristearate, ethylene oxide-propylene oxide block copolymers and the like; water-soluble emulsifiers such as polyoxyethylenesorbitan monolaurate, polyoxyethyleneglycerin oleate, sodium laurate, and the like; calcium carbonate, calcium phosphate, sodium dodecylbenzenesulfonate, and so forth. These may be used either singly or in combination of two or more.

These dispersing agents are preferably added in an amount of from 0.01 to 5 parts by weight per 100 parts of the monomer charge. The dispersing agent to the added to the polymerization reaction system may be dispersed or dissolved in a solvent such as water to make a dispersion or solution, such as aqueous solution, which is charged together with water or is fed under pressure into the polymerization reaction system.

If necessary, other additives conventionally used suitably in polymerization of vinyl chloride or the like may also added as desired. Such additives include, for example, polymerization regulators, chain transfer agents, pH adjustors, gelation improving agents, antistatic agents, cross-linking agents, stabilizing agents, fillers, antioxidants, buffers, scale preventives and so on.

In carrying out the polymerization, the aqueous medium (water) and the vinyl chloride monomer are preferably charged into the polymerization vessel in amounts such that the ratio of the amount of water to the amount of vinyl chloride monomer, by weight, ranges from 0.8 to 2.0, the ratio being suitably controlled according to quantity of heat to be removed, viscosity of slurry, and the like. Besides, water may be after-charged during polymerization, provided the total amount of water charged is within the specified range.

Other factors in carrying out the polymerization, such as the methods of charging the aqueous medium, monomer and the like into the polymerization vessel, may be the same as those conventionally employed. Also, polymerization conditions such as polymerization temperature or the like may be similar to those in conventional practices.

Where an ordinary centrifugal pump or the like is used as a circulating pump, the monomer liquid droplets suspended and dispersed under the stirring action in the polymerization vessel (part of the droplets may have become polymer particles) would, upon being introduced into the centrifugal pump or the like through the circulation piping, be torn up minutely under the high shearing forces exerted by the impeller of the pump. The minute particles formed in this way would, presumably, be deposited as scale on the inner surfaces of the circulation piping and heat exchanger tubes, and cause the finished polymer product to have a broader particle size distribution.

EXAMPLES

Example 1 and Comparative Examples 1 to 4

As shown in FIG. 1, an 80 m$^3$ stainless-steel polymerization vessel 1 equipped with jacket, a shell-and-tube type reflux condenser 7 having a heat transfer surface area of 100 m$^2$, a shell-and-tube type heat exchanger 2 having a heating surface area of 120 m$^2$ and a Hydrostal pump 4 (as a circulating pump) equipped with an inverter-type flow rate controller and having a pumping capability of 450 m$^3$/hr×35 m, were connected to each other through pipings, valves and the like.

The inside surfaces of the circulation piping, the inside surfaces of the heat exchanger tubes and the inside of the impeller casing of the Hydrostal pump were all specular-finished with buffing No.400 to have a surface roughness in terms of maximum height Rmax of 0.9 μm.

Before the charging of raw materials into the polymerization vessel, deionized water was introduced into the circulation piping, the circulating pump and the heat exchanger tubes to fill the circulation line with 5 t of deionized water.

Then, the polymerization vessel was charged with 40 t of deionized water, 91 kg of a solution of a partially saponified polyvinyl alcohol in deionized water, and 39 kg of a 10 wt. % cellulose ether solution in deionized water. Thereafter, evacuation is applied to the polymerization vessel to bring the internal pressure to 50 mmHg, and 26 t of vinyl chloride monomer was charged into the vessel.

Stirring of the mixture in the polymerization vessel was started, and 16.9 kg of t-butyl peroxyneodecanoate (10-h half-life temperature: 46.5° C.) and 16.9 kg of α-cumyl peroxyneodecanoate (10-h half-life temperature: 36.6° C.) were pumped into the vessel as polymerization initiators.

Thereafter, the stirrer of the polymerization vessel was operated under the conditions as given in Table 1. Simultaneously, the circulation under the circulation pump operating conditions as given in Table 1 was started, hot water was passed through the polymerization vessel jacket and through the heat exchanger, thereby raising the temperature inside the polymerization vessel to 55° C., and polymerization reaction was started. After the start of polymerization reaction, cooling water was passed through the jacket and the heat exchanger so as to maintain the reaction mixture in the vessel at 55° C., while polymerization was continued.

Operation of the reflux condenser was started at the time when a polymerization degree of 30% was reached. The condenser operation was continued until the pressure inside the polymerization vessel came to have a value of 7.6 kg/cm$^2$·G (corresponding to a polymerization degree of 77%).

At the time point that the inside pressure of the polymerization vessel reached 7.0 kg/cm$^2$·G, recovery of unreacted monomer was started, whereas the polymeric slurry was drawn out of the vessel, dehydrated and dried to yield a vinyl chloride polymer.

The vinyl chloride polymer thus obtained was subjected to measurements of properties as follows. The results are given in Table 1.

Deposition of polymer scale:

The above-described polymerization run was repeated 5 times, and deposition of polymer scale after the 5th batch of polymerization was observed.

Bulk specific gravity of polymer particles:
Measured according to JIS K 6721.
Particle size distribution:
Distribution of particle size (in mesh) was determined according to JIS Z 8801.
Plasticizer absorption:

Glass fibers were packed in the bottom of an aluminum alloy vessel 25 mm in inside diameter and 85 mm in depth, and a 10 g sample of the vinyl chloride polymer was placed into the vessel. Then, 15 cc of dioctyl phthalate (DOP) was added, and left to stand for 30 minutes so that the DOP permeated the polymer sufficiently. Excess portion of the DOP was centrifugally removed under an acceleration of 1500 G, and the amount of DOP absorbed in the polymer was determined in parts by weight per 100 parts by weight of the polymer.

Fish eyes:

Twenty-five (25) g of a mixture prepared by mixing 100 parts by weight of vinyl chloride polymer sample, 1 part by weight of tribasic lead sulfate, 1.5 parts by weight of lead stearate, 0.2 part by weight of titanium dioxide, 0.1 part by weight of carbon black, and 50 parts by weight of DOP, was kneaded by rolls at 145° C. for 3 minutes, and formed into a sheet 0.2 mm in thickness. For the sheet thus obtained, the number of transparent particles per 100 cm$^2$ area was counted.

The counting of transparent particles was conducted also for a similar sheet formed in the same manner as above except that the kneading was carried out by rolls at 145° C. for 5 minutes.

TABLE 1

|  | Example 1 | Comp. Ex. 1 | Comp. Ex. 2 | Comp. Ex. 3 | Comp. Ex. 4 |
|---|---|---|---|---|---|
| External circulation started when | Heating was started | Heating was started | Heating was started | Heating was started | Polymerization degree was 30% |
| Stirring energy in polymerization vessel (A) (kW/t) | 1.5 | 0.9 | 0.4 | 3.4 | 1.5 |
| Circulating energy (B) | 1.0 | 0.1 | 1.1 | 1.1 | 1.0 |
| (A) + (B) | 2.5 | 1.0 | 1.5 | 4.5 | 2.5 |
| (B)/[(A) + (B)] | 0.4 | 0.1 | 0.73 | 0.24 | 0.4 |
| Polymerization Time | 3 h 10 min | 3 h 0 min | 3 h 8 min | 3 h 10 min | One hour after the start of heating, the inside temperature started rising, so an inhibitor was put in to cause emergency stop. |
| Quiality of PVC |  |  |  |  |  |
| Bulk specific gravity: | 0.529 | 0.525 | 0.528 | 0.489 |  |
| Particle pass (wt. %) |  |  |  |  |  |
| size         60 mesh | 100 | 98.2 | 96.7 | 95.7 |  |
| distri-      100 mesh | 40.5 | 36.5 | 58.7 | 48.2 |  |
| bution:      200 mesh | 1.0 | 0.5 | 4.5 | 10.1 |  |
| Plasticizer absorption | 23.1 | 20.4 | 18.5 | 25.6 |  |
| Fish eyes | 15 | over 500 | 300 | 250 |  |
| Deposition of polymer scale | No scale deposited in piping, pump, or exchanger tube. Inside surfaces of the parts had metallic luster. | Much scale deposited in piping. A part of tube was completely blocked. A 2° C. rise in inside temp. at end of polymerization. | Much scale deposited in piping, and around gas-liquid interface in polymeriser. A 1° C. rise in inside temp. at end of polymerization. | Much scale deposited in piping, and around gas-liquid interface in polymeriser. |  |

We claim:

1. A process for preventing polymer scale deposition during suspension polymerization of a vinyl chloride-based monomer or a vinyl chloride-containing monomeric mixture in an aqueous medium in the presence of a dispersing agent and a polymerization initiator in a polymerization vessel equipped with a stirrer, the polymerization being carried out while circulating a reaction mixture in the polymerization vessel by a circulating pump through a circulation line which is led out from the polymerization vessel to extend through a heat exchanger back to the polymerization vessel, wherein said circulating pump comprises:

a casing composed of a truncated cone-shaped half portion and a generally disklike shaped half portion in connection with the base side of the truncated cone, said casing having an inlet for drawing the reaction mixture into the casing and an outlet for discharging the reaction mixture out of the casing, said inlet located on the smaller plane side of the truncated cone-shaped half portion, and said outlet located at a side portion of the disklike shaped half portion;

a conically shaped hub disposed internal to and central to the casing; and a single blade provided on a side portion of said hub in a spiral form extending substantially from the apex of the hub cone to the base of the hub cone, the outer edge of said blade being in such close proximity to the inner wall surface of said truncated cone-shaped half portion of the casing as to almost touch said inner wall surface, and wherein, during polymerization, the stirring energy (A) applied per ton of the reaction mixture by said stirrer in said polymerization vessel and the circulating energy (B) exerted per 1 ton weight of the reaction mixture by said circulating pump in said circulation line are controlled so as to satisfy the relationships represented by the formulas (1) and (2):

$$(A)+(B) = \text{from 1.5 to 4.0 } kW/t \qquad (1)$$

$$(B)/[(A)+(B)] = \text{from 0.1 to 0.6} \qquad (2).$$

2. The process of claim 1, wherein the stirring energy (A) and the circulating energy (B) are controlled so as to satisfy the relationships:

$$(A)+(B) = \text{from 1.5 to 3.0 } kW/t, \text{ and}$$

$$(B)/[(A)+(B)] = \text{from 0.2 to 0.5}$$

3. The process of claim 1, wherein the surfaces in the circulation line with which the reaction monomer comes into contact during polymerization have a surface roughness in terms of maximum height Rmax of 1 $\mu$m or less.

4. The process of claim 1, wherein the monomeric mixture is a mixture of vinyl chloride with at least one monomer selected from the group consisting of $\alpha$-olefins, acrylic acid, acrylic esters, methacrylic acid, methacrylic esters, maleic acid, maleic acid esters, vinyl esters, vinyl ethers, maleic anhydride, acrylonitrile, styrene and vinylidene chloride.

5. The process of claim 1, wherein said polymerization vessel has an internal capacity of 40 $m^3$ or more, and said polymerization is completed within a time of 4.5 hours.

* * * * *